United States Patent [19]

Iwano

[11] Patent Number: 6,078,414
[45] Date of Patent: Jun. 20, 2000

[54] OPTICAL TRANSMITTER SYSTEM

[75] Inventor: Tadayuki Iwano, Tokyo, Japan

[73] Assignee: NEC Corporation, Tokyo, Japan

[21] Appl. No.: 08/985,065

[22] Filed: Dec. 4, 1997

[30] Foreign Application Priority Data

Dec. 5, 1996 [JP] Japan .................................. 8-325219

[51] Int. Cl.[7] .......................... H04B 10/08; H04B 14/02
[52] U.S. Cl. ......................... 359/124; 359/110; 359/180; 359/182; 359/187
[58] Field of Search .................................. 359/180, 187, 359/182, 110, 133

[56] References Cited

U.S. PATENT DOCUMENTS

| | | | |
|---|---|---|---|
| 4,912,527 | 3/1990 | Yamazaki | 359/191 |
| 5,315,426 | 5/1994 | Aoki | 359/180 |
| 5,453,868 | 9/1995 | Bluvelt | 359/173 |
| 5,898,719 | 4/1999 | Ryu | 372/32 |
| 5,900,959 | 5/1999 | Noda | 359/180 |
| 5,956,166 | 9/1999 | Ogata | 359/125 |

FOREIGN PATENT DOCUMENTS

| | | |
|---|---|---|
| 0 570 937 A2 | 11/1993 | European Pat. Off. . |
| 0 752 792 A2 | 1/1997 | European Pat. Off. . |
| 4-293024 | 10/1992 | Japan . |
| 6-132935 | 5/1994 | Japan . |
| 8-293853 | 11/1996 | Japan . |
| 9-139715 | 5/1997 | Japan . |
| 10-135557 | 5/1998 | Japan . |
| WO 94/23525 | 10/1994 | WIPO . |

OTHER PUBLICATIONS

Y. Aoki, et al., "Stimulated Brillouin Scattering Suppression in IM/DD Optical Fiber Communication Systems with Optical Booster Amplifiers", NEC Corporation, Opto–Electronics Research Laboratories, pp. 75–80.

Japanese Office Action, dated Aug. 18, 1999, with English language translation of Japanese Examiner's comments.

Satoru, Y., "Group Calling System," publication number 01254028, publication date Nov, 10, 1989. Patent Abstracts of Japan, vol. 14, No. 009.

*Primary Examiner*—Jason Chan
*Assistant Examiner*—Agustin Bello
*Attorney, Agent, or Firm*—Whitham, Curtis & Whitham

[57] ABSTRACT

An optical transmitter system includes a semiconductor laser, an external modulator, a detector and a frequency-modulation controller. The semiconductor laser transmits an optical signal of a predetermined wavelength onto an optical fiber and a backscattering wave caused by the optical signal is detected by the detector. The frequency-modulation controller controls the semiconductor laser so that the amplitude of a frequency-modulation signal applied to the semiconductor laser is varied depending on a detection signal of the backscattering wave.

17 Claims, 2 Drawing Sheets

OPTICAL TRANSMITTER SYSTEM

BACKGROUND OF THE INVENTION

1. Field of the Invention

The present invention generally relates to an optical fiber transmission system, and in particular to an optical transmitter system coupled to optical fiber for use in the transmission system.

2. Description of the Related Art

Nonlinear effects in fiber may have a significant impact on the performance of optical fiber communication systems. One of the most significant effects may be caused by Stimulated Brillouin Scattering (SBS). When SBS occurs, the backscattering wave propagates in the opposite direction of the input light, resulting in attenuation of light at the receiving end which would not be compensated for by the input light increasing in power. Further, SBS may lead to distortion and noise, affecting the bit error rate at the receiver.

It has been known that SBS occurs when the level of input light exceeds a certain threshold $P_{TH}$ which is proportional to $(\Delta V_{SBS} + \Delta V_{LD})/\Delta V_{SBS}$, where $\Delta V_{SBS}$ is Brillouin bandwidth and $\Delta V_{LD}$ is the spectral line width of signal light input into an optical fiber. In the case of a system employing an external modulator coupled to semiconductor diode laser operating at a wavelength of 1.55 μm, the threshold $P_{TH}$ is on the order of several decibels (dB), which probably leads to SBS in optical fiber amplifier systems.

To suppress SBS, the semiconductor laser is driven by a bias current on which a frequency-modulation signal is superimposed as an SBS suppression signal. Such a SBS suppression method has been proposed by Y. Aoki et al ("Stimulated Brillouin Scattering Suppression in IM/DD Optical Fiber Communication System with Optical Booster Amplifiers", IEICE, Nov. 21, 1991, pp75–80). By applying a frequency-modulation signal, chirping occurs in the output light of the semiconductor laser. Since chirping causes the spectral line width $\Delta V_{LD}$ to be broadened, the threshold level $P_{TH}$ becomes higher (see FIG. 3 of page 76 in the above paper by Y. Aoki et al.). That is, the larger the superimposed level of the frequency-modulation signal, or the SBS suppression signal, the higher the threshold level $P_{TH}$ at which SBS starts occurring. However, in the case of the frequency-modulation signal of great amplitude, the wave form of laser light is degraded, leading to a degradation of transmission performance. Therefore, it is important to adjust the modulation degree of SBS suppression signal. More specifically, the SBS suppression signal should be set to a minimum level at which SBS does not occur.

Several disadvantages exist in the case of a wavelength-division multiplexing (WDM) system where a plurality of wavelength signals are combined by an optical coupler and then amplified by an optical fiber amplifier. The output light of the optical fiber amplifier includes variations in signal level from wavelength to wavelength because of variations in-output light level from semiconductor laser to semiconductor laser, variations in loss from port to port of the optical coupler, and the gain characteristic of the optical fiber amplifier.

In conventional optical transmitters for use in WDM systems, the superimposed level of the SBS suppression signal is set for each semiconductor laser so as to be matched with the input light having the maximum power which is estimated from the above variations and characteristics. Therefore, the wave forms of laser signals other than the maximum power signal are degraded due to excessive superimposed level of the SBS suppression signal, leading to a degradation of transmission performance.

SUMMARY OF THE INVENTION

An object of the present invention is to provide an optical transmitter system which can improve the transmission performance of an optical fiber communication system.

Another object of the present invention is to provide an optical transmitter system which can optimally suppress a degradation of transmission optical signals.

According to the present invention, a circuit is provided with an optical light source for transmitting an optical signal of a predetermined wavelength onto an optical fiber. A back-propagating wave caused by the optical signal is detected by a detector from the optical fiber and a detection signal corresponding to the back-propagating wave is produced. The light source is controlled to vary in a degree of frequency modulation depending on the detection signal.

According to another aspect of the present invention, a circuit is provided with a plurality of optical transmitters each comprising a laser light source for producing a light wave of a different wavelength, an optical modulator for modulating the light wave according to input data to produce an optical signal, and a frequency-modulation driver for driving the laser light source in predetermined frequency modulation. The optical signals output from the optical transmitters are combined by an optical coupler to produce optical wavelength-division multiplexing (WDM) signals. The optical WDM signals are amplified by an optical fiber amplifier and are transmitted onto an optical fiber. A detector detects a back-propagating wave caused by each of the optical WDM signals from the optical fiber to produce a detection signal and a controller controls the frequency-modulation driver of an optical transmitter transmitting the optical signal to vary a degree of frequency modulation depending on the detection signal.

Since the degree of frequency modulation is adjusted according to the detection signal of each back-propagating wave, the modulation degree of SBS suppression signal can be easily set to a minimum level at which SBS does not occur. Therefore, a degradation of transmission optical signals can be optimally suppressed, resulting in improved transmission performance of an optical fiber communication system. As will be described hereinafter, a frequency-modulation signal is also a chirp-generation signal for generating chirping of a laser light source or a spectral width control signal.

DETAILED DESCRIPTION OF THE PREFERRED EMBODIMENT

Figure 1:
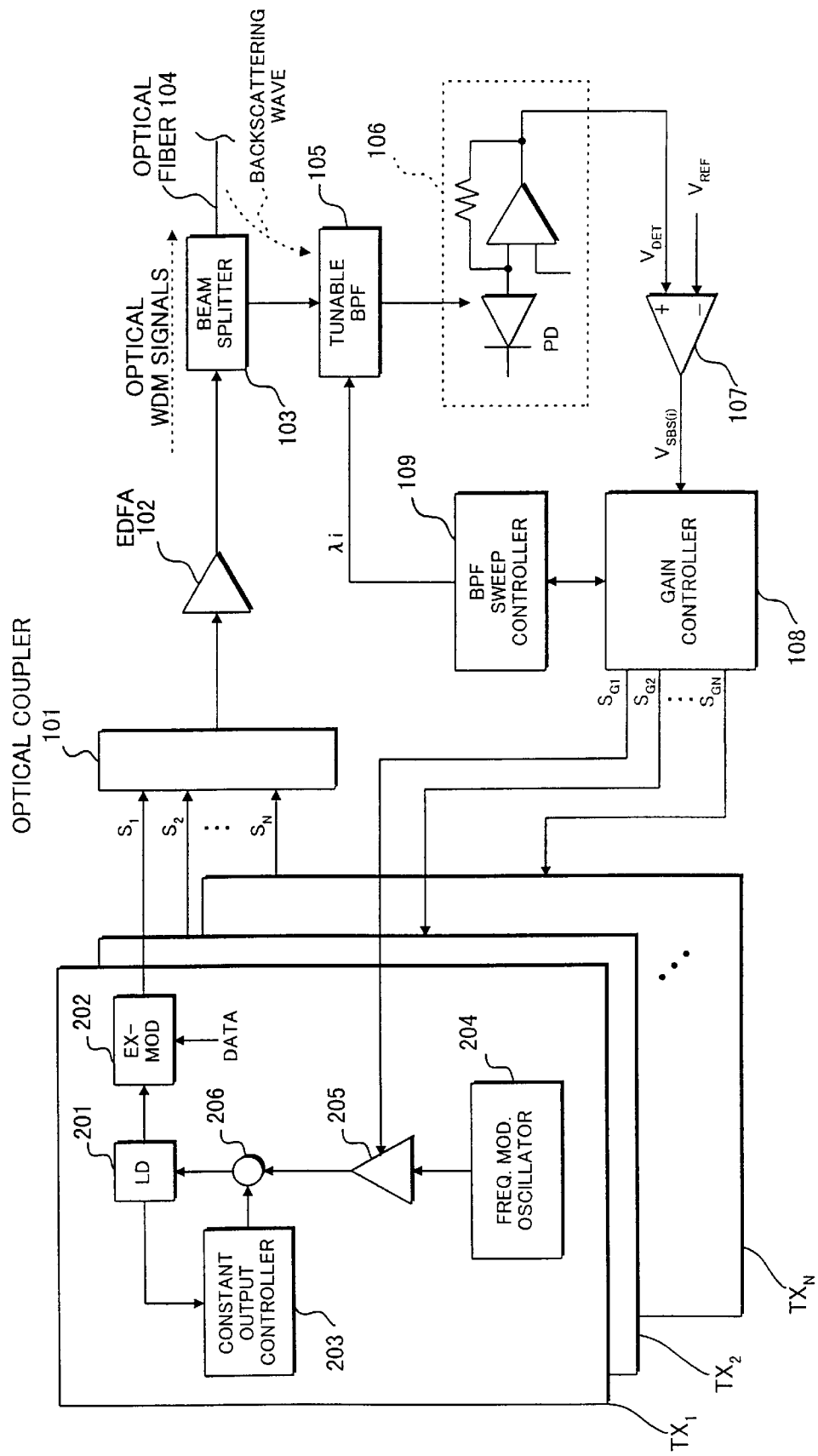
FIG. 1 is a block diagram showing an optical transmitter system according to an embodiment of the present invention.

Referring to FIG. 1, there is an optical transmitter system for use in an optical fiber transmission system using WDM technology. The optical transmitter system includes a plurality of optical transmitters $TX_1$–$TX_N$ which transmit optical signals $S_1$–$S_N$ with different wavelengths, respectively. The optical signals $S_1$–$S_N$ are combined into optical WDM signals by an optical coupler 101 such as fused coupler or waveguide combiner. The optical WDM signals are amplified by an optical fiber amplifier 102 such as rare-earth-element-doped fiber amplifier, typically Er-doped fiber amplifier (EDFA). The optical fiber amplifier 102 has a gain characteristic over a broad band including the wavelengths of the optical signals $S_1$–$S_N$.

The amplified optical WDM signals pass through a beam splitter 103 onto optical fiber 104. The beam splitter 103 splits a backscattering wave caused by SBS propagating through the optical fiber 104 in the opposite direction of the optical WDM signals. An optical circulator may be used in place of the beam splitter 103. A part of the backscattering wave is used for SBS suppression control.

A part of the backscattering wave is transferred to a tunable optical bandpass filter 105 which is capable of tuning to N different wavelengths $\lambda_1$–$\lambda_N$ depending on sweep control signal as will be described later. The backscattering wave of a wavelength $\lambda_i$ passing through the tunable bandpass filter 105 is converted to a voltage signal $V_{DET}$ by a photo detector 106 which is composed of a photodiode PD and a current-to-voltage converter.

A differential amplifier 107 inputs the voltage signal $V_{DET}$ from the photo detector 106 and produces a voltage difference $V_{SBS}(i)$ between the voltage signal $V_{DET}$ and a reference voltage $V_{REF}$. When receiving the voltage difference $V_{SBS}(i)$ from the differential amplifier 107, a gain controller 108 generates a gain control signal $S_{Gi}$ based on the voltage difference $V_{SBS}(i)$ in cooperation with a BPF sweep controller 109 and outputs it to the corresponding optical transmitter $TX_1$. The BPF sweep controller 109 outputs a sweep control signal to the tunable bandpass filter 105. More specifically, when the BPF sweep controller 109 sets the tunable bandpass filter 105 at a wavelength $\lambda_1$, the gain controller 108 generates the gain control signal $S_{Gi}$ base on the voltage difference $V_{SBS}(i)$ and outputs it to the corresponding optical transmitter $TX_1$. Therefore, the gain controller 108 sequentially controls the optical transmitter $TX_1$–$TX_N$ depending on which wavelength is selected by the BPF sweep controller 109.

The optical transmitters $TX_1$–$TX_N$ has the same circuit configuration. Each optical transmitter $TX_1$ is provided with a semiconductor laser 201 operating at a different wavelength. The output light of the semiconductor laser 201 is intensity-modulated to produce an optical output signals $S_1$ according to transmission data. The intensity modulation is carried out by an external modulator 202 which is a high-speed electro-optic on-off switch. For example, a semiconductor electro-absorption modulator or an LN modulator using lithium niobate (LiNbO$_3$) can be used. The semiconductor laser 201 and the semiconductor electro-absorption modulator can be integrated The output light of the semiconductor laser 201 is kept constant by a constant output controller 203 controlling a bias current supplied to the semiconductor laser 201 while monitoring its output light. Further, an oscillator 204 generates a frequency-modulation signal $S_{PN}$ on the order of several kHz to several MHz. The frequency-modulation signal $S_{FM}$ is amplified by a variable-gain amplifier 205 whose gain is varied depending on the gain control signal $S_{Gi}$ received from the gain controller 108. The combiner 206 superimposes the frequency-modulation signal $S_{FM}$ on the bias current to produce a driving signal which is applied to the semiconductor laser 201. Since the driving signal includes frequency components on the order of several kHz to several MHz, chirping occurs in the semiconductor laser 201 and therefore the spectral line width $\Delta V_{LD}$ is caused to be broadened, resulting in reduced SBS. In other words, by adjusting the amplitude of the frequency-modulation signal $S_{PM}$, or modulation degree, depending on the gain control signal $S_{Gi}$, the amount of chirping occurring in the semiconductor laser 201 can be optimally controlled.

Figure 2:
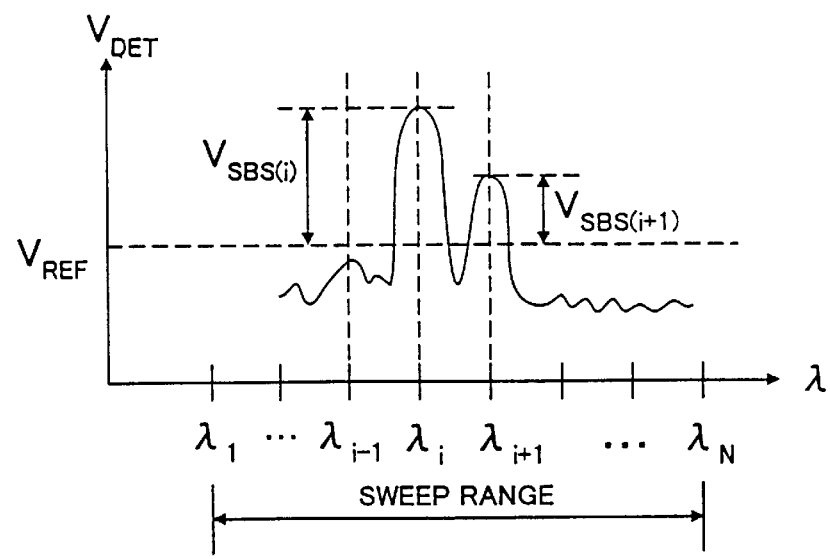
FIG. 2 is a diagram showing a wave form of detected backscattering wave caused by SBS to explain an operation of the embodiment.
Figure 3:
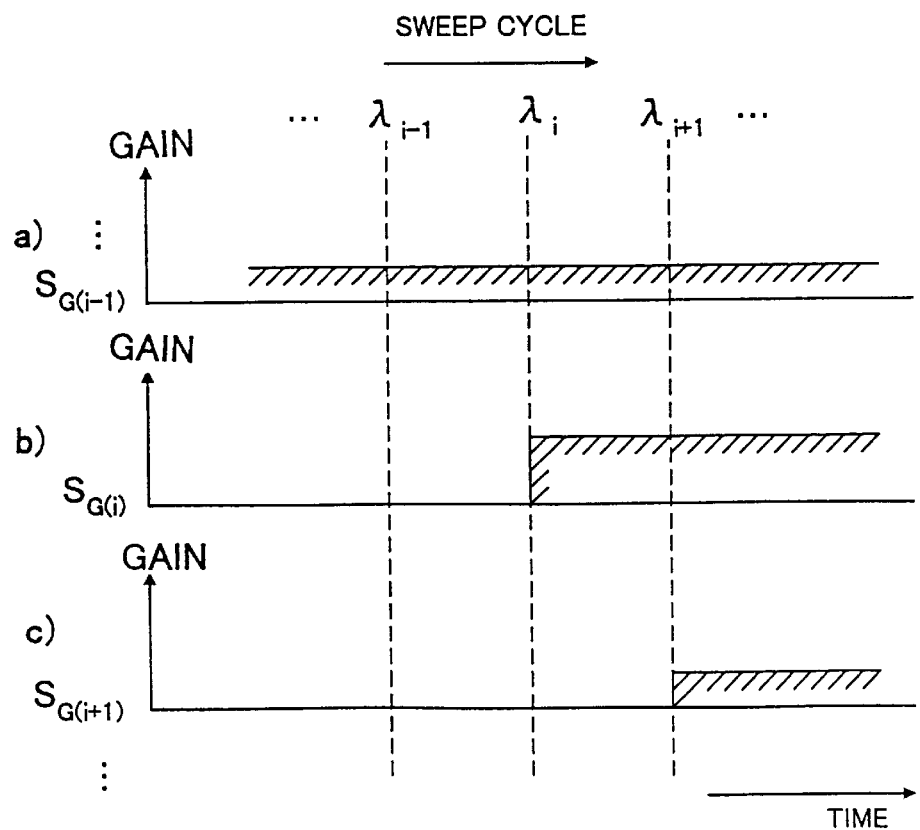
FIG. 3 is a time chart showing an example of gain control signals for chirping control.

FIG. 2 shows an illustrative waveform of a voltage signal $V_{DET}$ obtained when the tunable bandpass filter 105 sequentially tunes to wavelengths $\lambda_{i-1}$, $\lambda_1$, and $\lambda_{i+1}$ and FIG. 3 shows the magnitude of gain control signals corresponding to the wavelengths $\lambda_{i-1}$, $\lambda_1$ and $\lambda_{i+1}$, respectively. Here, it is assumed for simplicity that a voltage signal $V_{DET}$ obtained at wavelength $\lambda_{i-1}$ is lower than the reference voltage $V_{REF}$ and voltage signals $V_{DET}$ obtained at wavelengths $\lambda_1$ and $\lambda_{i+1}$ are higher than the reference voltage $V_{REF}$.

When the tunable bandpass filter 105 tunes to the wavelength $\lambda_{i-1}$, the backscattering wave of the wavelength $\lambda_{i-1}$ can pass through the tunable bandpass filter 105 and then is converted into the voltage signal $V_{DET}$ by the photo detector 106. Since the voltage signal $V_{DET}$ obtained at wavelength $\lambda_{i-1}$ is lower than the reference voltage $V_{REF}$, the gain controller 108 does not vary the gain control signal $S_{G(i-1)}$ which is output to the variable-gain amplifier 205 of the corresponding optical transmitter $TX_{i-1}$ as shown in a) of FIG. 3.

When the tunable bandpass filter 105 tunes to the wavelength $\lambda_1$, the backscattering wave of the wavelength $\lambda_1$ can pass through the tunable bandpass filter 105 and then is converted into the voltage signal $V_{DET}$ by the photo detector 106. Since the voltage signal $V_{DET}$ obtained at wavelength $\lambda_1$ is higher than the reference voltage $V_{REF}$, the gain controller 108 receives the voltage difference $V_{SBS}(i)$ from the differential amplifier 107 and varies the gain control signal $S_{G(i)}$ depending on the voltage difference $V_{SBS}(i)$ as shown in b) of FIG. 3. The gain control signal $S_{G(i)}$ is output to the variable-gain amplifier 205 of the corresponding optical transmitter $TX_i$. The amplitude of the frequency-modulation signal $S_{PM}$ is varied according to the gain control signal $S_{G(i)}$ so as to eliminate the occurrence of SBS due to the output light signal $S_1$.

Similarly, when the tunable bandpass filter 105 tunes to the wavelength $\lambda_{i+1}$, the backscattering wave of the wavelength $\lambda_{i+1}$ can pass through the tunable bandpass filter 105 and then is converted into the voltage signal $V_{DET}$ by the photo detector 106. Since the voltage signal $V_{DET}$ obtained at wavelength $\lambda_{i+1}$ is higher than the reference voltage $V_{REF}$, the gain controller 108 receives the voltage difference $V_{SBS}(i+1)$ from the differential amplifier 107 and varies the gain control signal $S_{G(i+1)}$ depending on the voltage difference $V_{SBS}(i+1)$ as shown in c) of FIG. 3. The gain control signal $S_{G(i+1)}$ is output to the variable-gain amplifier 205 of the corresponding optical transmitter $TX_{i+1}$. The amplitude of the frequency-modulation signal $S_{PM}$ is varied according to the gain control signal $S_{G(i+1)}$ so as to eliminate the occurrence of SBS due to the output light signal $S_{i+1}$.

In this manner, the backscattering wave corresponding to each transmission signal of a predetermined wavelength is detected and the modulation degree of the corresponding semiconductor laser is controlled depending on the magnitude of the detected backscattering wave. Such a control is repeatedly performed for each sweeping to suppress SBS effectively and reliably in WDM systems.

As an example, consider the case where a 1.55 $\mu$m-band semiconductor electro-absorption modulator is used to perform modulation of 2.4 Gbps and the modulated light signal propagates over an optical fiber having a core diameter of 8 µm. In this case, if the above SBS suppression system is not employed, SBS occurs when the level of the modulated light signal is increased to approximately +5 dBm or more. Contrarily, if the above SBS suppression system is employed to apply the gain-controlled frequency-modulation signal $S_{PM}$ to the semiconductor laser 201, the spectral line width of the modulated light signal is broadened to 150 MHz or more. Therefore, SBS can be suppressed until the level of the modulated light signal exceeds +12 dBm.

What is claimed is:

1. A circuit comprising:
    a plurality of optical transmitters each comprising:
        (i) a laser light source which produces a light wave of a different wavelength;
        (ii) an optical modulator which modulates the light wave according to input data to produce an optical signal; and
        (iii) a frequency-modulation driver which drives the laser light source in predetermined frequency modulation;
    an optical coupler which combines optical signals received from the optical transmitters to produce optical wavelength-division multiplexing (WDM) signals;
    an optical amplifier which amplifies the optical WDM signals for transmission onto an optical fiber;
    a detector which sequentially detects back-propagating waves caused by respective ones of the optical WDM signals from the optical fiber to produce a plurality of corresponding detection signals, the back-propagating waves propagating in a direction opposite to the optical WDM signals; and
    a controller which sequentially controls the frequency-modulation drivers of said plurality of optical transmitters to vary a degree of frequency modulation performed by the frequency-modulation drivers depending on respective ones of said detection signals.

2. The circuit according to claim 1, wherein the frequency-modulation driver in each of said plurality of optical transmitters comprises:
    an oscillator which generates a frequency-modulation signal; and
    a variable-gain amplifier which varies an amplitude of the frequency-modulation signal depending on a gain control signal received from the controller to apply an amplified frequency-modulation signal to the laser light source.

3. The circuit of claim 1, wherein the frequency modulation driver in each of said optical transmitters includes a combiner for combining a bias current with a control signal for broadening a spectral line width of the light wave output therefrom.

4. The circuit of claim 3, wherein the control signal is a chirp-generation signal which causes chirping of the semiconductor laser.

5. The circuit of claim 3, wherein the control signal is an SBS suppression signal.

6. The circuit of claim 3, wherein the bias current is kept constant by a constant control circuit.

7. A circuit, comprising:
    a plurality of optical transmitters each comprising:
        (i) a laser light source for producing a light wave of a different wavelength,
        (ii) an optical modulator for modulating the light wave according to input data to produce an optical signal, and
        (iii) a frequency-modulation driver for driving the laser light source in predetermined frequency modulation;
    an optical coupler for combining optical signals received from the optical transmitters to produce optical wavelength-division multiplexing (WDM) signals;
    an optical fiber amplifier for amplifying the optical WDM signals to transmit onto an optical fiber;
    a detector for detecting a back-propagating wave caused by each of the optical WDM signals from the optical fiber to produce a detection signal, the back-propagating wave propagating in opposite direction of he optical WDM signals; and
    a controller for controlling the frequency-modulation driver an an optical transmitter transmitting the optical signal to vary a degree of frequency modulation depending on the detection signal,
    wherein the detector comprises:
        an optical coupler for receiving back-propagating waves from the optical fiber, the back-propagating waves having different wavelengths in a wavelength range;
        a selector for selecting one of the back-propagating waves in a predetermined sequence; and
        a converter for converting a selected back-propagating wave to the detection signal.

8. The circuit according to claim 7, wherein the selector comprises:
    a tunable bandpass filter for selectively passing the back-propagating waves depending on a wavelength selection signal; and
    a sweep controller for generating the wavelength selection signal such that the wavelengths of the back-propagating waves are selected in sequence.

9. The circuit according to claim 8, wherein the controller controls the frequency-modulation driver of an optical transmitter selected depending on the wavelength selection signal received from the sweep controller.

10. An optical transmitter system comprising:
    a plurality of optical transmitters each comprising:
        (i) a semiconductor laser which produces a light wave of a predetermined wavelength, the semiconductor laser being driven by a bias current combined with a control signal for broadening a spectral line width of the light wave; and
        (ii) an external modulator which intensity-modulates the light wave according to input data to produce an optical signal which is transmitted onto an optical fiber;
    a detector which sequentially detects back-scattering waves caused by respective ones of the optical WDM signals due to Stimulated Brillouin Scattering (SBS) occurring in the optical fiber to produce detection signals; and
    a controller which sequentially controls a magnitude of the control signals corresponding to the optical signal produced from each of said optical transmitters depending on respective ones of the detection signals.

11. An optical transmitter system, comprising:
    a plurality of optical transmitters each comprising:
        (i) a semiconductor laser for producing a light wave of a predetermined wavelength, the semiconductor laser being driven by a bias current combined with a control signal for broadening a spectral line width of the light wave; and
        (ii) an external modulator for intensity-modulating the light wave according to input data to produce an optical signal which is transmitted onto an optical fiber;

a detector for detecting a back-scattering wave caused by each of the optical WDM signals due to Stimulated Brillouin Scattering (SBS) occurring in the optical fiber to produce a detection signal; and a controller for controlling a magnitude of the control signal corresponding to the optical signal depending on respective ones of the detection signal, wherein the detector comprises:

an optical coupler for receiving back-scattering waves from the optical fiber, the back-scattering waves having different wavelengths in a wavelength range;

a selector for selecting one of the back-scattering waves in a predetermined sequence; and a converter for converting a selected back-scattering wave to the detection signal.

12. The optical transmitter system according to claim 11, wherein the selector comprises:

a tunable bandpass filter for selectively passing the back-scattering waves depending on a wavelength selection signal; and a sweep controller for generating the wavelength selection signal such that the wavelengths of the backscattering waves are selected in sequence.

13. The optical transmitter system according to claim 12, wherein the controller controls the control signal of an optical transmitter selected depending on the wavelength selection signal received from the sweep controller.

14. A control method for a plurality of optical transmitters each including a laser light source for producing a light wave of a different wavelength, an optical modulator for modulating the light wave according to input data to produce an optical signal, and a frequency-modulation driver for driving the laser light source in predetermined frequency modulation, the control method comprising the steps of:

a) combining optical signals received from the optical transmitters to produce optical wavelength-division multiplexing (WDM) signals;

b) amplifying the optical WDM signals for transmission onto an optical fiber;

c) sequentially detecting back-propagating waves caused by respective ones of the optical WDM signals from the optical fiber to produce corresponding detection signals, the back-propagating waves propagating in an opposite direction of the optical WDM signals; and d) sequentially controlling the frequency-modulation drivers of said optical transmitters to vary a degree of frequency modulation performed by the frequency-modulation drivers depending on respective ones of the detection signals.

15. A control method for a plurality of optical transmitters each comprising a laser light source for producing a light wave of a different wavelength, an optical modulator for modulating the light wave according to input data to produce an optical signal, and a frequency-modulation driver for driving the laser light source in predetermined frequency modulation, the control method comprising the steps of:

a) combining optical signals received from the optical transmitters to produce optical wavelength-division multiplexing (WDM) signals;

b) amplifying the optical WDM signals for transmission onto an optical fiber;

c) detecting a back-propagating wave caused by each of the optical WDM signals from the optical fiber to produce a detection signal, the back-propagating wave propagating in opposite direction of the optical WDM signals; and d) controlling the frequency-modulation driver of an optical transmitter transmitting the optical signal to vary a degree of frequency modulation depending on the detection signal, wherein the step c) comprises the steps of:

receiving back-propagating waves from the optical fiber, the back-propagating waves having different wavelengths in a wavelength range;

selecting one of the back-propagating waves in predetermined sequence; and converting a selected back-propagating wave to the detection signal.

16. The method according to claim 15, wherein the selecting step comprises the steps of:

selectively passing the back-propagating waves through a tunable bandpass filter depending on a wavelength selection signal; and generating the wavelength selection signal such that the wavelengths of the back-propagating waves are selected in sequence.

17. A feedback loop for suppression of Stimulated Brillouin Scattering (SBS) in an optical transmitter system, comprising:

a plurality of optical transmitters, each optical transmitter comprising:

(i) a semiconductor laser for producing a light wave of the predetermined wavelength, the semiconductor laser being driven by a bias current combined with a control signal for broadening a spectral line width of the light wave, and (ii) an external modulator for intensity-modulating the light wave according to input data to produce an optical signal which is transmitted onto an optical fiber;

a detector for selectively detecting back-scattering waves caused by optical signals output from said plurality of optical transmitters due to SBS to produce detection signals, respectively; and a laser controller for controlling a magnitude of the control signals of said optical transmitters based on respective ones of said detection signals.

* * * * *